Feb. 6, 1940.  G. W. PENNEY  2,189,614
OZONE CONTROL FOR PRECIPITATORS
Filed May 6, 1938  2 Sheets-Sheet 1
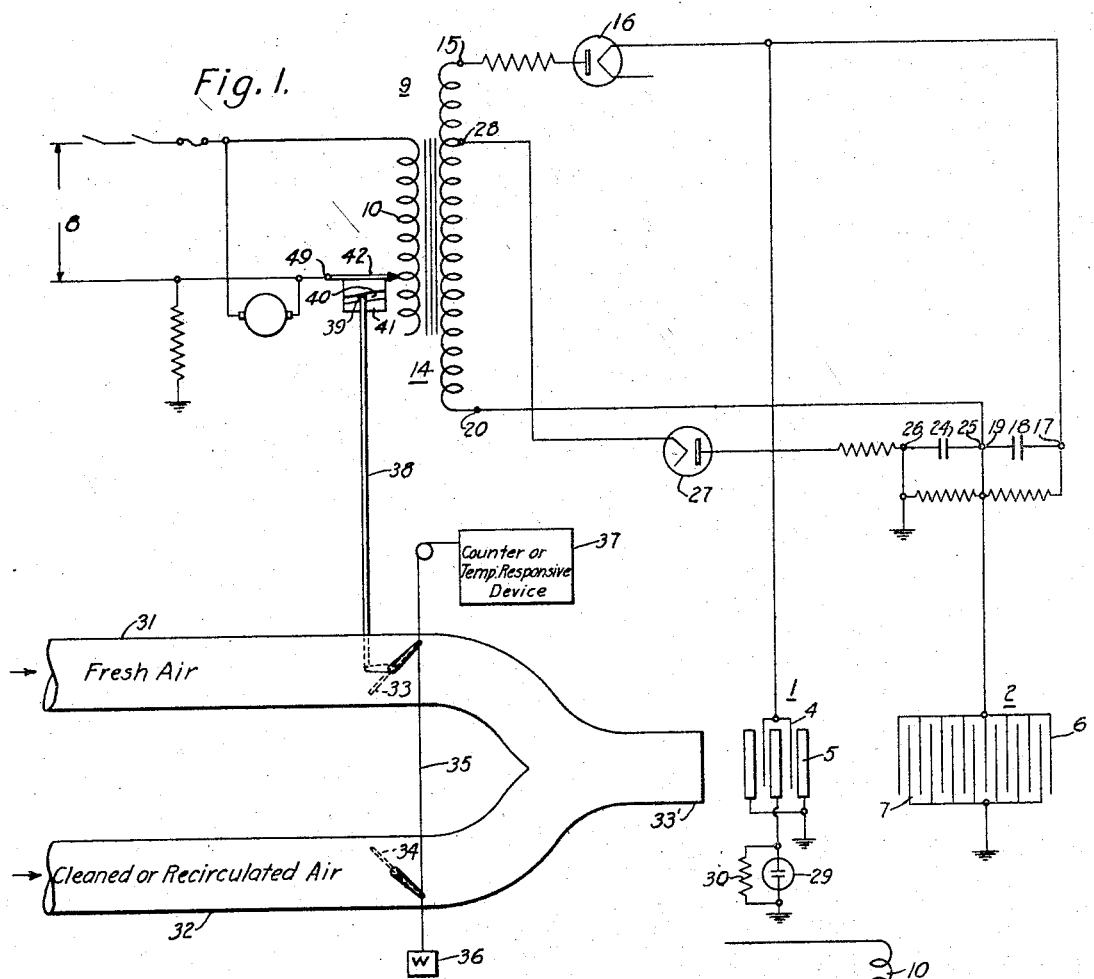
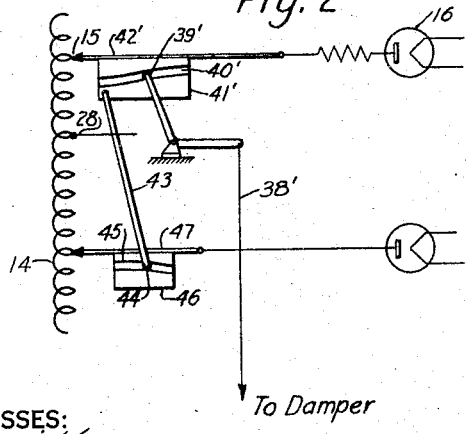
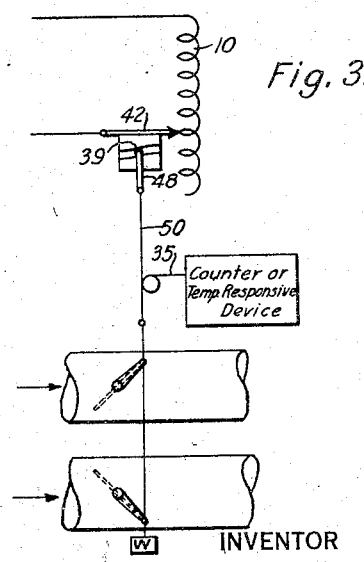
WITNESSES:
INVENTOR
Gaylord W. Penney
BY
ATTORNEY Feb. 6, 1940.   G. W. PENNEY   2,189,614
OZONE CONTROL FOR PRECIPITATORS
Filed May 6, 1938   2 Sheets-Sheet 2
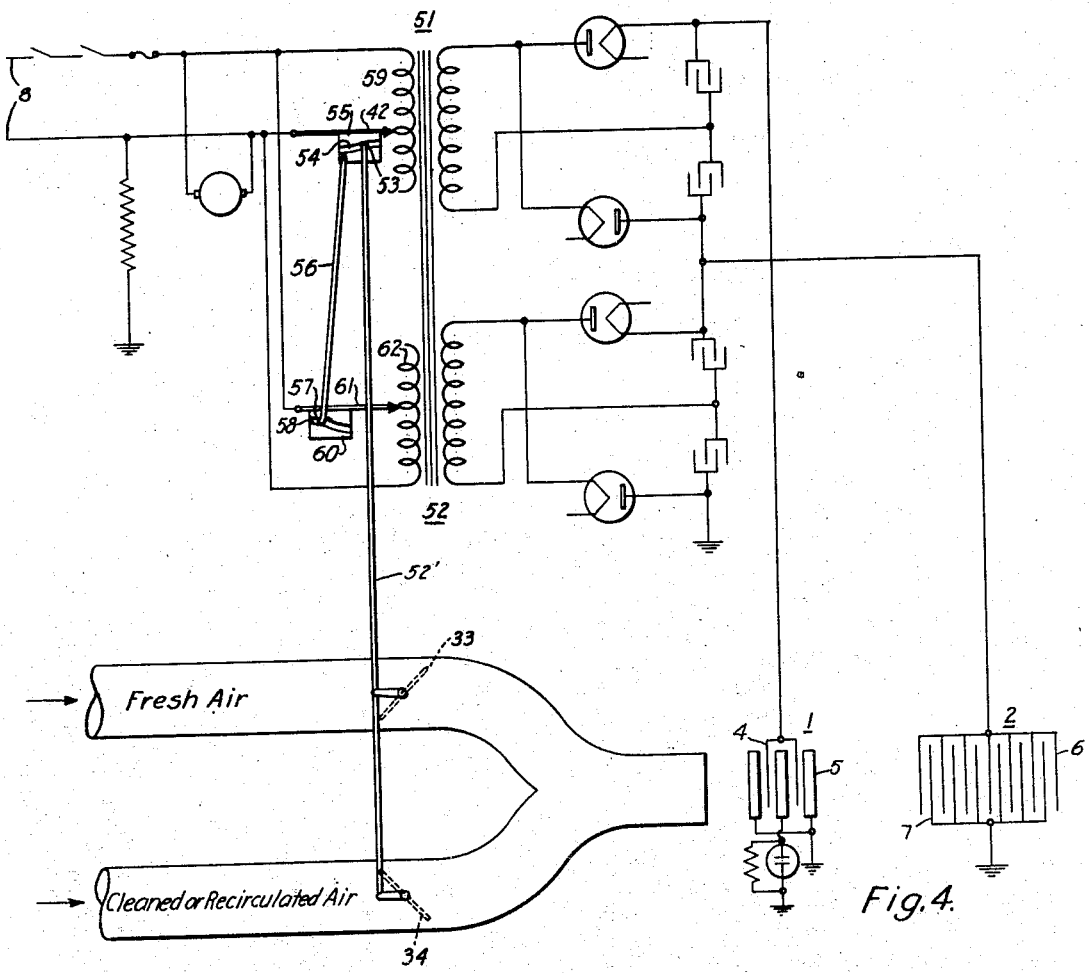
Fig. 4.
Fig. 5.
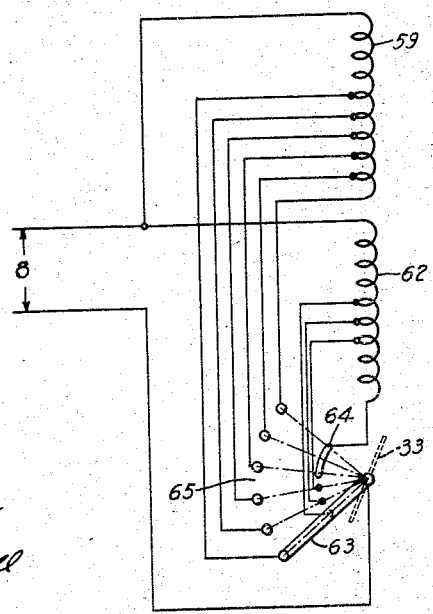
WITNESSES:
Fred. C. Witham
Bernard L. Zangwill
INVENTOR
Gaylord W. Penney
BY O. B. Buchanan
ATTORNEY Patented Feb. 6, 1940

2,189,614

UNITED STATES PATENT OFFICE 2,189,614

OZONE CONTROL FOR PRECIPITATORS

Gaylord W. Penney, Wilkinsburg, Pa., assignor to Westinghouse Electric & Manufacturing Company, East Pittsburgh, Pa., a corporation of Pennsylvania Application May 6, 1938, Serial No. 206,380

12 Claims. (Cl. 183—7)

In application Serial No. 45,070, filed Oct. 15, 1935 by myself and assigned to the Westinghouse Electric & Manufacturing Company, and which has matured into Patent 2,129,783, granted September 13, 1938, I disclose an electrostatic air cleaner for precipitating all kinds of foreign particles from air or any other gaseous fluids. My precipitator operates along the general principle of charging or ionizing the foreign particles in the air and collecting them by electrostatic deposition. In my particular precipitator I pass air to an ionizing zone in which zone the foreign particles such as dust and the like are given electric charges. The air continues into a collector zone which consists usually of a plurality of parallel plates having alternate charges. The charged particles passing between the plates are attracted to a plate of opposite charge and adhere thereto, the clean air continuing through the collecting zone.

One of the factors determining an acceptable precipitator for air cleaning is the amount of ozone created or generated in the air as the air flows through the different zones. The ozone created is usually a function of the voltage between the ionizing elements for a particular construction thereof. However, it is always desirable to operate a precipitator at the maximum voltage which does not give an objectionable ozone content for the reason that the maximum cleaning efficiency is thereby obtained for a given precipitator.

Where a large proportion of the air being cleaned is fresh air, the precipitator may be adjusted to operate at a voltage for maximum cleaning with a minimum of ozone generation. Usually the ozone generated is so negligible that I am aware of no instance in which a cleaner operating along the principle set forth in my aforesaid application has not been satisfactory even with the most rigid of operating requirements. However, in many instances, and in particular in large systems, a certain amount of the air to be cleaned has already been cleaned and is recirculated through the precipitator with the addition of some fresh air. In some particular cases all the air passing through the precipitator may be air that has already been cleaned thereby. When a precipitator is used with recirculated air, it is at once apparent that the ozone generated in one passage of the air through the unit, unless removed otherwise, is added to the ozone generated in each successive passage, and in this manner the ozone content may cumulatively increase.

Usually the number of recirculations per unit time is sufficiently low or the ozone generated during each passage of recirculated air through the cleaner is sufficiently absorbed in the space being conditioned that the unit may be operated at a high efficiency and a relatively large amount of ozone generation per passage is permissible.

However, in rare cases a combination of circumstances may exist wherein the limits of permissible ozone content are so rigid, the frequency of passages of recirculated air is sufficiently great, or the sensitivity of the place being air conditioned to even minute ozone content is so delicate that exceptional precautions must be taken to prevent the ozone content exceeding the prohibitive limits which may be reached by the cumulative increase of the ozone content as the air is repeatedly recirculated.

On the other hand, a combination of circumstances may exist wherein the limits of ozone content are moderate so that with a large percentage of fresh air passing through the cleaner a relatively large but harmless amount of ozone is permissible, but when, under similar circumstances the air being conditioned has a large percentage of recirculation, the tendency toward cumulative increase of ozone content may be great enough also to require exceptional precautions to prevent an excess of ozone content from accumulating. Fortunately, when all fresh air is being used, a high voltage with resultant high efficiency can be employed with no cumulative increase of ozone. When recirculated air is added, then for a given volume of air being cleaned the content of the foreign particles is necessarily less since some of the air has already been cleaned. The precipitator may, therefore, be operated at a slightly lower voltage and efficiency which will not, however, lower the overall or resultant cleanliness of the air, but which will decrease the amount of ozone generated. Accordingly, it is proposed to regulate the ionizing voltages, and where required, the plate voltages, in response to the amount of recirculated air as compared to the amount of fresh air passing through the cleaner.

It is accordingly an object of my invention to lower the possibility of excessive ozone accumulation in systems employing recirculating or previously cleaned air.

It is a further object of my invention automatically to minimize the possibility of excessive ozone accumulation in re-circulating systems by controlling the ionizing voltage as a function of the proportion of re-circulating air to the total air intake.

In most re-circulating systems, dampers are inserted in the fresh air conduit and the re-circulating air conduits, these dampers being controlled in response to some physical condition. Thus, it is not uncommon to have the inside temperature, or outside temperature, or a combination of both, control the dampers. Again, and particularly in auditoriums or entertainment houses, the dampers may be controlled in response to the number of people therein. Other factors are frequently taken into consideration as is well known. In this system which I now propose, I can control the ionizing voltage or I can control the collector plate voltages, or both, from the dampers which are controlled by such physical factors, or may even control the voltages directly by the various physical factors themselves.

Many other objects and novel features of my invention and equivalents thereof will be apparent from the following description, in the drawings of which I symbolically represent in:

Figure 1 one embodiment wherein the voltage is controlled by the position of the dampers;

Fig. 2 a modification of Fig. 1 in which individual voltage controls are applied for the ionizing and collector zones;

Fig. 3 a modification in which the voltage is varied directly by the physical factor which controls the dampers;

Fig. 4 my invention applied to a unit having separate transformers for the ionizing and collector zones;

Fig. 5 still another modification of a means of voltage control.

Referring to Fig. 1, the precipitator has an ionizing zone shown symbolically at 1 and a collector zone shown symbolically at 2. For greater details of a preferred construction of these parts, reference may be had to my aforesaid application.

Briefly, the ionizing zone includes ionizing wires 4 and cooperating rods 5 having a potential therebetween and the collector zone includes oppositely disposed parallel plates 6 and 7, the electrostatic field and voltage differentials for which may be created by any appropriate electrical circuit. To illustrate the principle of my invention, I show a circuit which includes commercial power mains 8 across which is connected transformer 9. Transformer 9 is preferably made of the high leakage type as a matter of safety and comprises a primary winding 10 and a secondary winding 14. One terminal 15 of the secondary winding is connected through a high resistance to the plate of any appropriate rectifier tube 16, the filament or cathode of this tube being connected to the ionizing wires 4. The cathode of the tube 16 also connects to one terminal 17 of a condenser 18, the other terminal 19 of which is connected to the other terminal 20 of the transformer secondary 14. A condenser 24 has one of its terminals 25 also connected to the secondary end terminal 20, the other terminal 26 of the condenser being connected through a high resistance to the plate of a secondary rectifier tube 27. The cathode of this rectifier tube connects to an intermediate point 28 of the secondary 14.

As is shown in Fig. 1, terminal 26 is grounded which necessarily grounds all circuits conducted thereto at this point. If desired, leakage resistances may be connected across the condensers 18 and 24, respectively.

The parallel collector plates 6 are conductively joined together and to the terminal 28, the opposite plates 7 being grounded. Rods 5 in the ionizing zone may all be grounded, but I desire to ground all but one of them, the latter being grounded through a neon tube 29 in parallel with a resistance 30, this neon tube serving as an indicator.

The circuits thus far described are substantially the equivalent of those disclosed in my aforesaid application and operate in the same way; that is, a positive potential is applied to the ionizing wires 5 and a positive potential is applied to the collector plates 6, these potentials being determined by the particular construction employed so that a maximum of cleaning is obtained with a minimum of ozone generation.

Fresh air duct 31 and clean or re-circulated air duct 32 merge into the common main supply air duct 33' for the cleaner unit. The fresh air duct has its inlet opening to the outside atmosphere, while the re-circulated air duct has its inlet opening to the premises being air conditioned. This structure is well known to the art and may follow any of a number of forms (not shown). Within the branch ducts 31 and 32 are dampers 33 and 34, respectively, for controlling the proportion of air each branch duct is to supply to the main duct 33'. The positions of the dampers may be controlled by any appropriate means which I have shown symbolically as comprising a wire or the like 35 connected to the ends of operating devices for the dampers and positioning them. It is obvious that these wires may be external to the ducts and may be connected to elements integral with the dampers as for example the crank arms shown. The wire 35 has a means represented by the weight 36 tending to position the dampers with the fresh air duct fully opened and the clean air duct fully closed. By means of a mechanism 37, which may be a counter for counting the number of persons in the premises being supplied with cleaned air, or a temperature responsive device, or any device responsive to some physical factor involved in air conditioning, the wire 35 is moved against the force of the weight 36 in accordance with variations in the particular physical factor. This movement of the wire will tend to close fresh air damper 33 and open the clean or re-circulated air damper 34. Attached to the shaft of one of the dampers is a linkage system 38 which moves in accordance with the movement of the dampers and, therefore, in accordance with the change in the physical factor aforesaid.

At the end of the linkage system 38 is a roller 39 moving in a cam groove 40 of a cam 41 attached to a movable voltage regulator arm 42, and preferably insulated therefrom. The arm 42 is pivoted at 49, and is in the main circuit supplying the primary 10 of the transformer 9 and varies the number of turns of the primary as the linkage 38 changes its position. The cam groove 40 may follow any desired contour or curvature, so that the voltages applied to the precipitating elements of the cleaner unit may be in accordance with any values desired relative to the positions of the dampers 33. In this manner, as the fresh air damper 33 is closed and the cleaned air damper 34 is opened, the number of turns in the primary may be increased, thereby decreasing the potential across the ionizing wires 4 and the rods 5, as well as the potential between the collector plates 6 and 7.

In Fig. 2 I show wherein the secondary voltages may be controlled in accordance with the positions of the dampers rather than the primary winding as shown in Fig. 1. By this construction I can independently vary the potentials in the ionizing zone and in the collector zone. The linkage 38', which is connected to move with the dampers, has a roller 39' moving in a cam groove 40' of a cam 41' attached to the voltage regulating arm 42'. Pivoted on the cam 41' is a link 43 having a roller 44 at one end thereof. This roller 44 moves in the cam groove 45 of a cam 46 attached to voltage regulating arm 47. It is obvious that as the dampers move, the roller 39' will move in the cam groove 40' raising or lowering, as the case may be, the regulating arm 42' in any desired relationship determined by the shape of the cam groove 40'. Moreover, movement of the cam 41' causes the roller 44 to move within its cam groove 45, the shape of this cam groove also being determined by the amount it is desired to vary the potential across the collector plates for given positions of the dampers. Usually, I prefer to vary the potential across the collector plates only to a slight degree, if at all, most of the voltage control being effected in the ionizing zone, inasmuch as whatever ozone is created by the cleaning apparatus occurs in this latter zone.

In Fig. 3 I show symbolically wherein the position of voltage regulating arm 42 determining the number of turns in the primary winding 10 is controlled directly from the variable physical factor. Cam roller 39 is attached to a link 48, which in turn is attached to the wire 35 by means of a second wire 50. Manifestly, if desired, the wire 50 may control the secondary voltages rather than the primary voltages in accordance with the showing of Fig. 2.

In Fig. 4 I show the application of my invention to a cleaning unit of higher capacity than that of Fig. 1. In this unit, separate transformers 51 and 52 comprise sources of high potentials for the ionizing zones and collector zones. Movement of the dampers 33 and 34 by the physical factor moves the link 52', having roller 53 riding in the cam groove 54 of a cam 55 attached to the voltage regulating arm 42 for the primary 59 of the transformer 51. The movement of the cam 55 is transmitted to the link 56, which also has a roller 57 riding in cam groove 58 of a cam 60 attached to voltage regulating arm 61 for the primary 62 of the transformer 52. This structure operates along the principles and in the manner of the previous figures, that is, movement of the link 52' in accordance with the movement of the dampers 33 and 34 causes roller 53 to ride in the cam groove 54 and position the regulating arm 42. At the same time, roller 57 rides in cam groove 58 positioning the regulating arm 61. The movements of the regulating arms, of course, control the voltages between the electrodes of the ionizing zone and between the plates of the collector zone.

In Fig. 5 I show wherein I do away with the linkage and cams of the previous figures. Taps are brought from the primaries 59 and 62 and terminate in proximity to one of the dampers— shown in Fig. 5 as damper 33. Moving with the damper is a regulating arm 63 sliding over two sets of contacts 64 for the primary 62, and 65 for the primary 59. As the arm 63 moves, the number of turns in the primary 59 and the number of turns in the primary 62 are obviously changed. However, it may be observed that in the first three positions of the arm 63 no change is made in the number of turns of the primary 62 so that no change is made in the potential across the collector plates.

The percentages of change in the two voltages, that is, the voltage across the ionizing elements and the voltage across the collector elements, are not necessarily the same. The principle is generally to reduce the plate voltage to give negligible current and to adjust the ionizing voltage, to give the necessary low generation of ozone with high cleaning efficiency. Thus, for example, I may start with standard conditions, that is, 95% efficiency and 100 microamperes per foot of ionizing wire when the unit is operating with a fresh air supply only. If the current is now reduced to one-half, I thereby reduce the efficiency to 93%, and the relative ozone generated to approximately one-half of the amount generated under standard conditions; or if the current is reduced one-fourth, an efficiency of 91% is obtained while only one-fourth of the ozone with standard conditions is generated. However, while the efficiency of the unit is decreased with the two adjustments above described, the over-all cleaning actually increases as compared to outdoor air. For example, standard conditions with fresh air resulting in a 95% cleaning efficiency yields air 95% clean in the premises supplied with this air. However, with one-half recirculation and an adjustment of the current to one-half its value, the air in the premises is 96¼% clean. With three-fourths recirculated air and one-fourth of the current the air in the premises is 97½% clean. This, of course, is due to the fact that the recirculated air has already been cleaned. These figures are only indicative of how my invention may be utilized and shows that the actual cleanliness of the room air can be made to improve with recirculation while preventing an increase in the concentration of ozone.

My invention is obviously susceptible to different forms and mechanical expedients for the control of the transformer secondary voltages. I fully contemplate the use of any electric telemetering system or self-synchronizing system or the like for moving any of the regulating arms in accordance with the position of the dampers or directly in accordance with the variation in the physical factors determining the amount of permissible ozone generation. Moreover, in most instances, the ionizing potential only need be changed for it is in the ionizing zone that the ozone is created except in rare instances. However, for each ionizing voltage there is a maximum plate potential by which the maximum efficiency of cleaning under particular conditions can be obtained. Accordingly, I have also shown wherein the voltage between the collector plates may be varied, if such be desired to give the maximum efficiency for the particular occasion.

It is obvious that many changes may be made within the spirit and scope of the novel system which I have introduced. Thus, for example, the separate ionizing and collector zones I have shown can be combined into a single zone, as is common in the art, and that other gaseous atmospheres can be substituted for "air" which I desire shall, therefore, be broadly construed. It is desired, therefore, that the appended claims be given the broadest construction consistent with their language and limited by the prior art.

I claim as my invention:

1. In a system for cleaning air supplied to an enclosure, an electrostatic precipitator having an air outlet to said enclosure, air inlet means to said precipitator comprising a duct for fresh air and a duct for air from said enclosure, said precipitator having ionizing means through which the air passes, said ionizing means being of a type which inherently generates small amounts of ozone, and means to decrease the ozone generating power of said ionizing means in accordance with the relative amounts of air supplied to said precipitator by said ducts.

2. An air cleaning system comprising an electric precipitator having a plurality of electrodes for ionizing and collecting dust particles and the like, means to apply variable potentials between cooperative electrodes of said electrodes, said precipitator also having an air outlet means, a fresh air inlet and an electrostatically-cleaned air inlet, and means to control the air admitted through said inlets and said first named means.

3. An electrostatic precipitator comprising a plurality of electrodes for ionizing and collecting dust particles and the like, means to apply variable potentials between cooperative electrodes of said electrodes, an air inlet and outlet for said precipitator, said inlet having provisions for admitting fresh air and electrostatically cleaned air to said precipitator, and means responsive to the inlet amount of previously cleaned air relative to fresh air for controlling said first-named means whereby the ozone generation is controlled.

4. An electrostatic precipitator for cleaning air for an enclosure comprising a plurality of electrodes for ionizing and collecting dust particles and the like, means to apply variable potentials between cooperative electrodes of said electrodes, an air outlet for said precipitator, a fresh air inlet for said precipitator, a recirculating air inlet for said precipitator, means to control the relative amounts of fresh and recirculating air and said first means whereby the ozone generation is controlled.

5. An electrostatic precipitator having a plurality of electrodes for ionizing and collecting dust particles and the like, means for applying variable potentials between cooperative electrodes of said electrodes, an air outlet for said precipitator, a fresh air inlet for said precipitator, a recirculating air inlet for said precipitator, dampers for said inlets, and means responsive to the position of said dampers for controlling the first-named means whereby the ozone generation is controlled.

6. An electrostatic precipitator for cleaning air for an enclosure having ionizing electrodes and collecting electrodes, means comprising a transformer and rectifier for applying a potential between said ionizing electrodes, means for applying a potential between said collecting electrodes, and means to vary the potential applied to said ionizing electrodes by the first said means in response to variations of an external factor in said enclosure whereby the ozone generation is controlled.

7. An electrostatic precipitator having ionizing electrodes and collecting electrodes, means comprising a transformer and rectifier for applying a potential between said ionizing electrodes, means for applying a potential between said collecting electrodes, means to vary the potential applied to said ionizing electrodes by the first means, variable means to admit different proportions of fresh and electrostatically cleaned air to the precipitator, and means responsive to variations of the last-named means for controlling said third means whereby the ozone generation is controlled.

8. The apparatus of claim 5 wherein said last means operates upon the primary of said transformer.

9. The apparatus of claim 5 wherein said third means operates upon the primary of said transformer.

10. A precipitator comprising ionizing electrodes and collector electrodes, means comprising a transformer and rectifiers for applying variable potentials between said ionizing electrodes, a second means comprising a transformer and rectifier for applying variable potentials between said collector electrodes, means to vary the potential applied to said ionizing electrodes, means to vary the potential applied to said collector electrodes, variable means to admit different proportions of fresh and electrostatically cleaned air to the precipitator, and means responsive to variation of the last said means for operating the said potential varying means but in different degrees whereby the ozone generation is controlled.

11. In a system for cleaning air supplied to an enclosure, an electric precipitator having a plurality of electrodes for ionizing and collecting dust particles and the like, means to apply variable potentials between cooperative electrodes of said electrodes, means to supply said precipitator with electrostatically-cleaned air, and means to control the first said means in accordance with the amount of air supplied by the second named means.

12. In a system for controlling the ozone content of an enclosure supplied with air cleaned electrostatically, the method which comprises passing a mixture of fresh air and air from said enclosure through an electrostatic field, varying the proportions of said fresh air and air from said enclosure, and changing said field in accordance with the said proportions.

GAYLORD W. PENNEY.